US010242317B2

(12) United States Patent
Barhorst et al.

(10) Patent No.: US 10,242,317 B2
(45) Date of Patent: Mar. 26, 2019

(54) SYSTEM FOR ESTIMATING THE AMOUNT AND CONTENT OF FUMES

(71) Applicant: ILLINOIS TOOL WORKS INC., Glenview, IL (US)

(72) Inventors: Steven Edward Barhorst, Sidney, OH (US); Susan Renata Fiore, Dublin, OH (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 472 days.

(21) Appl. No.: 14/553,713

(22) Filed: Nov. 25, 2014

(65) Prior Publication Data

US 2016/0148098 A1 May 26, 2016

(51) Int. Cl.
| | | |
|---|---|---|
| *B08B 15/00* | (2006.01) | |
| *G06N 5/04* | (2006.01) | |
| *B23K 9/095* | (2006.01) | |
| *G05B 15/02* | (2006.01) | |
| *B08B 15/02* | (2006.01) | |
| *B23K 9/16* | (2006.01) | |
| *B23K 9/32* | (2006.01) | |

(52) U.S. Cl.
CPC ............ *G06N 5/04* (2013.01); *B08B 15/002* (2013.01); *B08B 15/02* (2013.01); *B23K 9/0953* (2013.01); *B23K 9/16* (2013.01); *B23K 9/325* (2013.01); *G05B 15/02* (2013.01)

(58) Field of Classification Search
None
See application file for complete search history.

(56) References Cited

U.S. PATENT DOCUMENTS

| | | | |
|---|---|---|---|
| 2,185,919 | A | 1/1940 | Kurth |
| 2,210,458 | A | 8/1940 | Keilholtz |
| 2,289,474 | A | 7/1942 | Anderson |
| 2,367,104 | A | 1/1945 | Demuth |
| RE24,637 | E | 4/1959 | Wulle |
| 2,910,558 | A | 10/1959 | Engelhardt |

(Continued)

FOREIGN PATENT DOCUMENTS

| | | |
|---|---|---|
| AU | 637737 | 6/1993 |
| CH | 682512 | 9/1993 |

(Continued)

OTHER PUBLICATIONS

"How to Measure Performance—A Handbook of Techniques and Tools," U.S. Department of Energy, Oct. 1, 1995, http://www.orau.gov/pbm/handbook/handbook_all.pdf.

(Continued)

*Primary Examiner* — Paul B Yanchus, III
(74) *Attorney, Agent, or Firm* — McAndrews, Held & Malloy, Ltd.

(57) ABSTRACT

A system includes a fume collection system that collects fumes from a welding operation, multiple data sources that detect operational data of the fume collection system and/or of the welding operation indicative of at least two of arc on time, operator factor, electrode feed speed, electrode size, and electrode type, an analysis system that analyzes the operational data and estimates fume data indicative of amount and content of the fumes, and a reporting system configured to populate at least one user viewable electronic report based upon the fume data.

35 Claims, 8 Drawing Sheets

(56) References Cited

U.S. PATENT DOCUMENTS

| | | |
|---|---|---|
| 3,318,227 A | 5/1967 | Nelson |
| 3,364,664 A | 1/1968 | Doane |
| 3,430,551 A | 3/1969 | Hauville |
| 3,487,767 A | 1/1970 | Kristiansen |
| 4,016,398 A | 4/1977 | Herrick |
| 4,043,257 A | 8/1977 | Aaberg |
| 4,158,462 A | 6/1979 | Coral |
| 4,160,407 A | 7/1979 | Duym |
| 4,163,650 A | 8/1979 | Bonham |
| 4,450,756 A | 5/1984 | Kling |
| 4,493,970 A | 1/1985 | Rieppel |
| 4,502,375 A | 3/1985 | Hignite |
| 4,510,374 A * | 4/1985 | Kobayashi ......... B23K 35/0266 219/146.1 |
| 4,552,059 A | 11/1985 | Potter |
| 4,607,614 A | 8/1986 | Higashino |
| 4,717,805 A | 1/1988 | Miyagawa |
| 4,825,038 A | 4/1989 | Smartt |
| 4,905,716 A | 3/1990 | Hubbard |
| 5,058,490 A | 10/1991 | Sodec |
| 5,069,197 A | 12/1991 | Wisting |
| 5,223,005 A | 6/1993 | Avondoglio |
| 5,263,897 A | 11/1993 | Kondo |
| 5,281,246 A | 1/1994 | Ray |
| 5,395,410 A | 3/1995 | Jang |
| 5,410,120 A | 4/1995 | Taylor |
| 5,427,569 A | 6/1995 | Plymoth |
| 5,540,214 A | 7/1996 | Boudreault |
| 5,713,346 A | 2/1998 | Kuechler |
| 5,718,219 A | 2/1998 | Boudreault |
| 5,890,484 A | 4/1999 | Yamada |
| 6,037,725 A | 3/2000 | Tolbert, Jr. |
| 6,099,607 A | 8/2000 | Haslebacher |
| 6,332,837 B1 | 12/2001 | Wilk |
| 6,358,137 B1 | 3/2002 | Threlfall |
| 6,486,439 B1 | 11/2002 | Spear |
| 6,607,573 B1 | 8/2003 | Chaurushia |
| 6,616,720 B1 | 9/2003 | Smith |
| 6,620,038 B1 | 9/2003 | Kikuchi |
| 6,624,388 B1 | 9/2003 | Blankenship |
| 6,632,132 B1 | 10/2003 | Kikuchi |
| 6,780,213 B2 | 8/2004 | Chang |
| 6,797,921 B1 | 9/2004 | Niedereder |
| 7,000,634 B2 | 2/2006 | Lindborg |
| 7,959,696 B2 | 6/2011 | Martic |
| 8,176,766 B1 | 5/2012 | Ruiz |
| 8,211,194 B2 | 7/2012 | Takayanagi |
| 8,312,873 B2 | 11/2012 | Gagas |
| 8,460,417 B2 | 6/2013 | Reid |
| 8,892,222 B2 | 11/2014 | Simms |
| 2002/0039881 A1 | 4/2002 | Coral |
| 2003/0181158 A1 | 9/2003 | Schell |
| 2005/0133488 A1 | 6/2005 | Blankenship |
| 2005/0170767 A1 | 8/2005 | Enzenroth |
| 2005/0204582 A1 | 9/2005 | Rossi |
| 2006/0157048 A1 | 7/2006 | Heilman |
| 2007/0225836 A1* | 9/2007 | Swanson ............... G05B 17/02 700/45 |
| 2008/0078811 A1 | 4/2008 | Hillen |
| 2008/0305731 A1 | 12/2008 | Reid |
| 2009/0065489 A1 | 3/2009 | Duffy |
| 2009/0173726 A1 | 7/2009 | Davidson |
| 2009/0234483 A1 | 9/2009 | Leko |
| 2009/0313549 A1 | 12/2009 | Casner |
| 2009/0321403 A1 | 12/2009 | Brenneke |
| 2010/0206799 A1 | 8/2010 | Leavitt |
| 2010/0224610 A1 | 9/2010 | Wallace |
| 2010/0282728 A1 | 11/2010 | Cole |
| 2010/0299185 A1 | 11/2010 | Caro |
| 2011/0114615 A1 | 5/2011 | Daniel |
| 2011/0117527 A1 | 5/2011 | Conrardy |
| 2011/0172796 A1 | 7/2011 | Sohmshetty |
| 2012/0136692 A1 | 5/2012 | Ohishi |
| 2012/0193330 A1 | 8/2012 | Edwards |
| 2012/0193334 A1 | 8/2012 | Mehn et al. |
| 2013/0075380 A1 | 3/2013 | Albrech |
| 2013/0122795 A1 | 5/2013 | Hammers |
| 2013/0162177 A1 | 6/2013 | Hofsdal |
| 2013/0244555 A1 | 9/2013 | Hammers et al. |
| 2013/0244556 A1 | 9/2013 | Hammers et al. |
| 2013/0244557 A1 | 9/2013 | Hammers et al. |
| 2013/0244558 A1 | 9/2013 | Hammers et al. |
| 2013/0244559 A1 | 9/2013 | Hammers et al. |
| 2013/0244560 A1 | 9/2013 | Hammers et al. |
| 2014/0213164 A1 | 7/2014 | Leisner et al. |
| 2014/0214213 A1 | 7/2014 | Rockenfeller |
| 2014/0253008 A1 | 9/2014 | Sykes |
| 2014/0277684 A1 | 9/2014 | Lamers et al. |
| 2014/0278242 A1 | 9/2014 | Lamers et al. |
| 2014/0278243 A1 | 9/2014 | Lamers et al. |
| 2015/0000232 A1 | 1/2015 | Hammers et al. |
| 2015/0004895 A1 | 1/2015 | Hammers et al. |
| 2015/0012865 A1 | 1/2015 | Lamers et al. |
| 2015/0019594 A1 | 1/2015 | Lamers et al. |

FOREIGN PATENT DOCUMENTS

| | | |
|---|---|---|
| CN | 2146665 | 11/1993 |
| CN | 2225253 | 4/1996 |
| CN | 2413708 | 1/2001 |
| CN | 1384909 | 12/2002 |
| CN | 101327109 | 12/2011 |
| CN | 202087569 | 12/2011 |
| CN | 102483240 | 5/2012 |
| CN | 101526239 | 7/2012 |
| CN | 104407161 | 3/2015 |
| DE | 1604293 | 9/1970 |
| DE | 3412204 | 10/1985 |
| DE | 4413600 | 11/1995 |
| DE | 10020736 | 10/2001 |
| DE | 20221100 | 1/2005 |
| DE | 102005016721 | 10/2006 |
| DE | 102005033224 | 7/2007 |
| DE | 102006055001 | 5/2008 |
| DE | 102009030220 | 12/2010 |
| EP | 0511576 | 11/1992 |
| EP | 0536871 | 4/1993 |
| EP | 1227283 | 7/2002 |
| EP | 1958738 | 8/2008 |
| EP | 1967796 | 9/2008 |
| EP | 2292367 | 3/2011 |
| EP | 2368646 | 9/2011 |
| EP | 2422865 | 2/2012 |
| FR | 2613551 | 10/1988 |
| FR | 2911520 | 7/2008 |
| GB | 546878 | 8/1942 |
| GB | 1069868 A | 5/1967 |
| GB | 2030825 | 5/1980 |
| GB | 2032825 A | 5/1980 |
| GB | 2454232 | 5/2009 |
| JP | S54147647 | 11/1979 |
| JP | H01179841 | 7/1989 |
| JP | H04063183 | 2/1992 |
| JP | H06292970 | 10/1994 |
| JP | H10288371 | 10/1998 |
| JP | H1147950 | 2/1999 |
| JP | 2007330987 | 12/2007 |
| KR | 20120017189 | 2/2012 |
| WO | 0048752 A1 | 8/2000 |
| WO | 0184054 | 11/2001 |
| WO | 2004088812 | 10/2004 |
| WO | 2005022046 | 3/2005 |
| WO | 2005045323 | 5/2005 |
| WO | 2005106337 | 11/2005 |
| WO | 2008032571 | 3/2008 |

OTHER PUBLICATIONS

Gilsinn, Jim et al.: "A Welding Cell That Supports Remote Collaboration", Ninth International Conference on Computer Technology in Welding, Sep. 30, 1999.

(56) References Cited

OTHER PUBLICATIONS

International Search Report from PCT application No. PCT/US2015/055037, dated Feb. 8, 2016, 10 pgs.

* cited by examiner

SYSTEM FOR ESTIMATING THE AMOUNT AND CONTENT OF FUMES

BACKGROUND

The invention relates generally to estimating fume amount and content of welding or other fume-producing processes.

A wide range of industrial, commercial, hobby and other applications result in fumes or airborne components. Metal working operations, for example, range from cutting, welding, soldering, assembly, and other processes that may generate smoke, fumes, particulates, or other airborne components. In other settings, such as machine shops, paint shops, woodworking shops, worksites where cutting, sanding and other operations are performed, dust, fumes, particulate and other types of airborne components may be generated.

Systems have been developed to measure the composition of fumes, or the presence of and concentration of airborne components in the air from inside a welder's mask, on the operator's person, or in and around the work area. However, these systems are expensive and complex. Additionally, such measurement systems are not available to operators performing work operations outside of a traditional workshop or factory setting (e.g., performing a welding operation outdoors using a truck-mounted welding system, painting the exterior of a house, cutting tile for a kitchen inside a residence, a hobbyist performing a work operation in a garage, etc.). Moreover, current techniques offer little or no integration of fume-related data into an easily comprehensible form for a human operator or monitor, and similarly offer little or no analysis or synthesis of the data for one or multiple fume-generating sources.

Further improvements are needed, therefore, in determining or estimating the presence and concentration of smoke, particulate materials, or other airborne components at a given moment in a way that is less expensive and more flexible.

BRIEF DESCRIPTION

In one embodiment a system includes a fume collection system that collects fumes from a welding operation, multiple data sources that detect operational data of the fume collection system and/or of the welding operation indicative of at least two of arc on time, operator factor, electrode feed speed, electrode size, and electrode type, an analysis system that analyzes the operational data and estimates fume data indicative of amount and content of the fumes, and a reporting system configured to populate at least one user viewable electronic report based upon the fume data.

In another embodiment a system includes a fume collection system that collects fumes from a fume-generating operation, multiple data sources that detect operational data of the fume collection system and/or of the fume-generating operation, an analysis system that analyzes the operational data and estimates fume data indicative of the amount and content of the fumes, and a reporting system configured to populate at least one user viewable electronic report based upon the fume data.

In another embodiment a method includes steps of extracting fumes from a welding operation via a fume extracting system, collecting operational data of the fume collection system and/or of the welding operation from multiple data sources; automatically analyzing the operational data to estimate fume data indicative of amount and content of the fumes, and generating a user viewable electronic report based upon the fume data.

In another embodiment a system includes multiple data sources that detect operational data of a fume-generating operation, an analysis system that analyzes the operational data to estimate fume data indicative of amount and content of the fumes, and a reporting system that populates at least one user viewable electronic report based upon the fume data.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
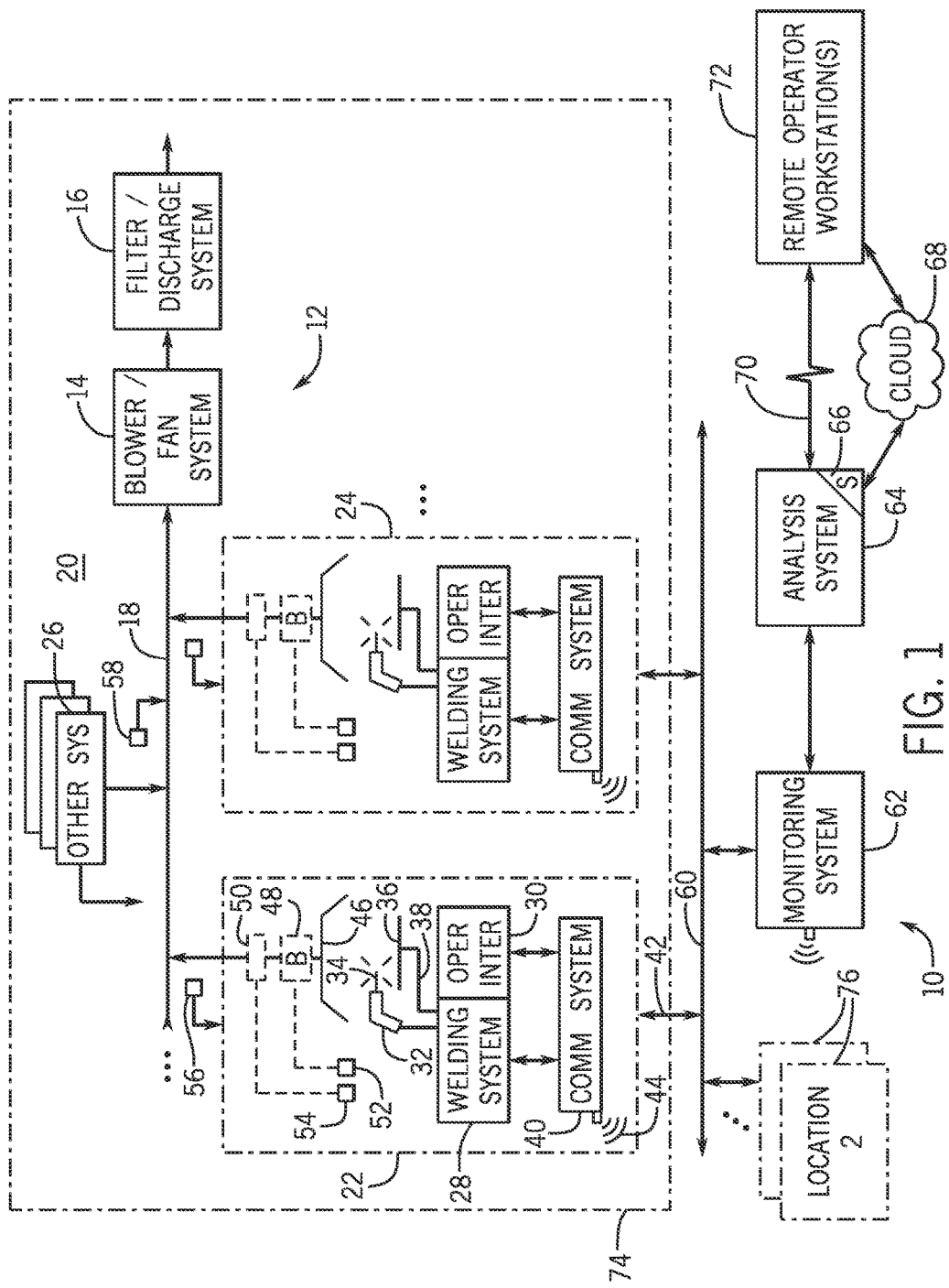
FIG. 1 is a diagrammatical representation of a welding enterprise using a predictive fume monitoring and analysis system in accordance with aspects of the present disclosure.

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

Systems and methods are disclosed for determining the presence and concentration of airborne components in a work environment or at a working station at a particular moment in time. The techniques are based upon the capture of data relating to air in the work environment and the estimation or measurement of airborne components. The techniques may be based on the use of application-specific or general purpose reports or viewers (more generally, interfaces) that can be web-based, cloud-based, or local to a particular welding or other fume-generating operation. In a presently contemplated embodiment, the systems and methods may use an interactive platform commercially available under the name Insight, from Miller Electric Manufacturing Co. in Appleton, Wis. This platform allows for monitoring and tracking various working parameters for industrial applications, such as welding operations. The platform may allow for collection of workplace data, analysis of the collected data, and may provide operators and managers with easy to understand reports and graphical representations of the collected data over a period of time or at a given moment. The Insight system may be used, for example, to monitor and analyze performance and to manage resources, such as gas and welding wire. However, when applied to an empirically determined look up table or a model, parameters measured and tracked by the Insight system (e.g., arc on time, operator factor, welding current, welding voltage, welding electrode feed speed, welding electrode size, welding electrode type, welding electrode composition, workpiece composition, etc.) may be used to estimate or predict the amount and content of the fumes generated by a welding operation at a given moment in time without actually measuring the amount and content of the fumes. Such a system may predict or estimate, in real time or on a delay, operational parameters such as fume generation rate (FGR), manganese content (MN) of the fumes being generated, spatter, and other factors for a particular welding station, welding cell, welding shop, or factory that have traditionally been available only by direct measurement. It should be understood, however, that the systems and methods disclosed herein are not limited to the Insight system or to welding operations. Predicting or estimating fume amount and content or the presence of airborne components based on working parameters may be applied to any number or working operations that produce fumes or airborne components, including welding (including GMAW or MIG, SMAW, GTAW or TIG, FCAW, SAW, ESW, HLHW, or any other type of welding), cutting, grinding, fiberglass work, painting, spraying, woodwork, glass or ceramic work, etc.

The systems and methods disclosed herein may be used in many different applications. The following examples are intended to give examples of how the systems and methods may be applied to various working operations and environments. It should be understood that the following examples are not intended to limit the scope of the disclosed systems and methods. For example, a system may track arc on time, operator factor, electrode feed speed, electrode size, and electrode type for a given welding station in order to estimate the fume generation rate (FGR) and the manganese content (MN) of the fumes being generated at the welding station at a given moment in time. In another example, a welding enterprise may track arc on time, operator factor, electrode feed speed, electrode size, and electrode type for each welding station in a given workshop and use the data to estimate the amount and content of fumes at a given location in the workshop at a given moment in time. The welding enterprise may also use this data to create a visual representation, for example a color coded map of the workshop indicating the various concentration levels throughout the workshop. In another environment, a paint shop, the system may track the type of paint used, the paint composition, the flow rate through the paint sprayer, and the amount of time the sprayer has been on to estimate the amount and content of paint fumes in a paint booth.

Disclosures and more detailed descriptions of exemplary data collection, processing, analysis and presentation techniques (such as those used in the Miller Electric Insight platform) are set forth in U.S. patent application Ser. No. 13/837,976 entitled "WELDING RESOURCE PERFORMANCE GOAL SYSTEM AND METHOD," filed on Mar. 15, 2013, U.S. patent application Ser. No. 13/838,860 entitled "WELDING RESOURCE TRACKING AND ANALYSIS SYSTEM AND METHOD," filed on Mar. 15, 2014, U.S. patent application Ser. No. 13/838,541 entitled "WELDING RESOURCE PERFORMANCE COMPARISON SYSTEM AND METHOD," filed on Mar. 15, 2013, U.S. patent application Ser. No. 14/316,219 entitled "WELDING SYSTEM PARAMETER COMPARISON SYSTEM AND METHOD," filed on Jun. 26, 2014, and U.S. patent application Ser. No. 14/316,250 entitled "WELDING SYSTEM DATA MANAGEMENT SYSTEM AND METHOD," filed on Jun. 26, 2014, which are hereby incorporated into the present disclosure by reference in their entirety.

Disclosures and more detailed descriptions of exemplary fume collection systems and techniques are set forth in U.S. Patent Application No. 61/312,545 entitled "FUME EXTRACTION FOR WELDING APPLICATIONS," filed on Mar. 10, 2010, U.S. patent application Ser. No. 13/356,160 entitled "FUME EXTRACTOR FOR WELDING APPLICATIONS," filed on Jan. 23, 2012, U.S. patent application Ser. No. 13/610,490 entitled "WELDING FUME EXTRACTOR," filed on Sep. 11, 2012, U.S. patent application Ser. No. 13/767,551 entitled "AIRBORNE COMPONENT EXTRACTOR WITH ADJUSTABLE FLOW RATES," filed on Feb. 14, 2013, U.S. patent application Ser. No. 13/753,398 entitled "FUME EVACUATION SYSTEM," filed on Jan. 29, 2013, U.S. patent application Ser. No. 13/767,601 entitled "AIRBORNE COMPONENT EXTRACTOR WITH IMPROVED FLOW PATHS," filed on Feb. 14, 2013, U.S. patent application Ser. No. 13/767,643 entitled "OPTIMIZED AIRBORNE COMPONENT EXTRACTOR," filed on Feb. 14, 2013, U.S. patent application Ser. No. 13/767,685 entitled "AIRBORNE COMPONENT EXTRACTOR MANIFOLD," filed on Feb. 14, 2013, U.S. patent application Ser. No. 13/767,716 entitled "AIRBORNE COMPONENT EXTRACTOR WITH IMPROVED POWER AND PRESSURE PERFORMANCE," filed on Feb. 14, 2013, U.S. patent application Ser. No. 13/767,745 entitled "AIRBORNE COMPONENT EXTRACTOR HOOD," filed on Feb. 14, 2013, U.S. patent application Ser. No. 14/300,598 entitled "AIRBORNE COMPONENT EXTRACTOR WITH BAFFLED DEBRIS COLLECTION," filed on Jun. 10, 2014, U.S. patent application Ser. No. 14/014,756 entitled "THREE-PHASE PORTABLE AIRBORNE COMPONENT EXTRACTOR WITH ROTATIONAL DIRECTION CONTROL," filed on Aug.

30, 2013, which are hereby incorporated into the present disclosure by reference in their entirety.

As described in detail below, provided herein are embodiments of a system for predicting the presence and concentration of airborne components at a welding station or in a welding environment at a given moment in time based on inputs and working parameters. Embodiments may or may not include a system that has a fume collection system that collects fumes from a welding operation, multiple data sources that detect operational data of the fume collection system and/or of the welding operation (e.g., arc on time, operator factor, electrode feed speed, electrode size, and electrode type), an analysis system that analyzes the operational data and estimates fume data indicative of amount and content of the fumes at a given moment in time, and a reporting system configured to populate at least one user viewable electronic report based upon the fume data.

Turning now to the drawings, FIG. 1 is a schematic of welding enterprise using a predictive fume monitoring and analysis system 10. The predictive fume monitoring and analysis system 10 may be implemented at a worksite with an air collection and exhaust system 12. The collection and exhaust system may include a fan or blower system 14, a filter and discharge system 16, and a network of headers and conduits 18, at a location 20. Air may be collected from the various welding locations 22, 24 or other workstations 26, drawn through the system of conduits 18 by the fan or blower system 14 to the filter and discharge system 16, where the air is filtered and either discharged or cycled back into the worksite.

In one embodiment, each welding location 22, 24 includes a welding system 28, an operator interface 30, a welding torch 32, with a wire electrode 34, a work piece 36, a return 38, and a communication system 40. The welding system may be for gas metal arc welding (GMAW) or metal inert gas welding (MIG), shielded metal arc welding (SMAW), gas tungsten arc welding (GTAW) or tungsten inert gas welding (TIG), flux-cored arc welding (FCAW), submerged arc welding (SAW), electroslag welding (ESW), hybrid laser hot wire (HLHW) or any other type of welding that the welding enterprise or operator may be interested in using. An operator will use the operator interface 30 to set parameters for a weld and control the welding torch 32. The operator interface 30 may also display information for the operator. The welding system 28 may be configured to collect operational data regarding the welding operation being performed. Such data may include information about the arc on time, operator factor, welding current, welding voltage, welding electrode wire feed speed, welding electrode wire size, welding electrode type, welding electrode composition, workpiece composition. This operational data may be measured using the Insight system, or some other similar system for measuring and tracking parameters of a working operation. The communication system 40 may then, through a hardwire connection 42, such as an Ethernet cable, or some sort of wireless connection 44, send information, for example welding parameters used in a previous weld, or receive information, such as desired parameters for the next weld, warnings, or instructions for the operator to the predictive fume monitoring and exhaust system 10.

If the welding location is in a shop, a factory, or some other place specifically set up for welding, there may be a hood 46 connected to a blower 48, and a valve 50, the blower 48 having a blower switch 52, and the valve 50 having a valve switch 54. The blower switch 52 and valve switch 54 allow the operator to turn the blower 48 and the valve 50 on and off. The blower would act to pull air up from around the welding torch 32 and into the conduits 18 of the collection and exhaust system 12. The fume collection points may be fixed (e.g., a hood) or movable (e.g., a cart). The system may also include sensors 56 at or around the welding locations 22, 24, and/or sensors 58 at one or more points along the system of headers and conduits 18. These sensors 56, 58 may take measurements of the flowing air such as temperature, flow rate, and perhaps even composition. It should be understood, however, that a fume collection and exhaust system 12 is not necessary for the systems and methods described herein. In fact, the systems and methods described herein would be especially useful to those performing welding, painting, cutting, or other work operations without a fume collection and exhaust system 12.

The communication system 40 communicates through a wired connection 42 or wireless connection 44 with a network 60. Also connected to the network may be a reporting and/or monitoring system 62, an analysis system 64 with a server 66, or a cloud-based resource 68. The monitoring and/or reporting system 62, which may be connected to the network through a wired or wireless connection, may monitor various welding locations 22, 24, within different worksites connected to a given network 60. The monitoring system 62 may monitor welding or other work operations in real time, on a delay, or after the operations have been completed. The monitoring system then communicates with the analysis system 64, which has a server 66. The analysis system 64 analyzes the collected data, and in turn communicates with the cloud-based resource 68, data storage, or with the remote operator workstation 72 over the Internet. The analysis system 64 then communicates back to the monitoring system 62, which communicates with the various welding locations at a worksite. The monitoring system 62, analysis system 64, cloud based resource 68, and remote operator workstations maybe connected to a single worksite 74, or multiple worksites 76. Such a system may allow a single entity to monitor and control welding operations at multiple worksites from a single location.

Figure 2:
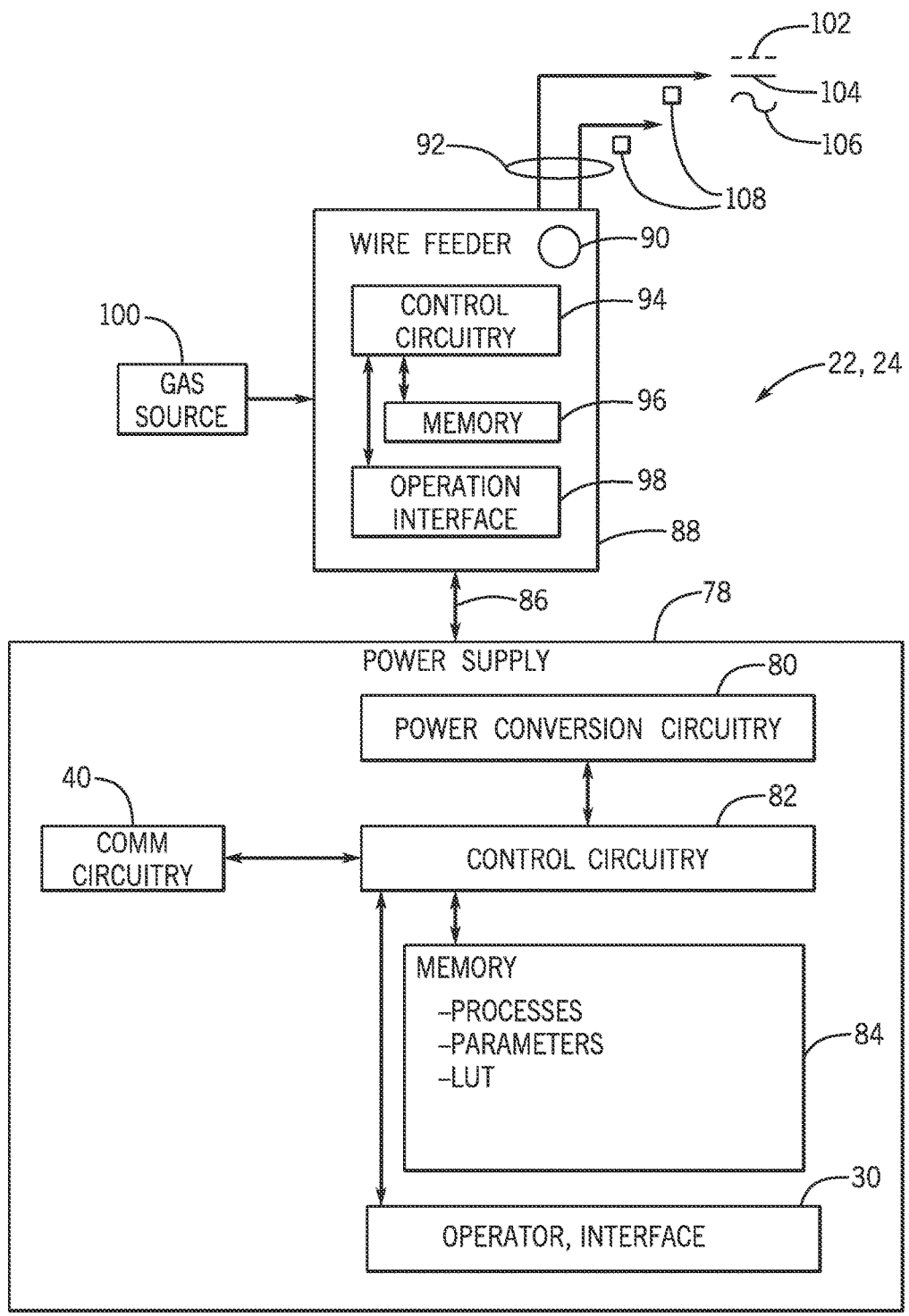
FIG. 2 is a diagrammatical representation of an embodiment of one of the welding locations shown in FIG. 1 in accordance with aspects of the present disclosure.

FIG. 2 is a schematic of an embodiment of the welding locations 22, 24 shown in FIG. 1. A specific welding location may have a power supply 78, which may include power conversion circuitry 80, control circuitry 82, memory 84, an operator interface 30, and communication circuitry 40. The power conversion circuitry 80 is configured to convert the supplied power to the appropriate power for the welding torch 32. The control circuitry 82 controls the power to the welding torch. The memory 84 stores files for the welding system, which may include processes, parameters, look up tables, or any other storable file which may be useful. The operator interface 30 allows the user to set certain parameters, such as desired power for the welding location 22, and also receive information from the system. The communication circuitry 40 allows the welding location 22 to communicate with the monitoring and analysis system.

The power supply 78 has a communication link 86 with the wire feeder system 88. The wire feeder system 88 may include a wire spool 90, weld cable 92, control circuitry 94, memory 96, and an operator interface 98. Wire is fed from the wire spool to the welding torch 32. Gas, power, and wire are all delivered to welding torch 32 through weld cable 92. The control circuitry 94 controls the wire feeder 88. The operator interface 98 allows the operator to input the desired wire feed speed, or any other desired parameter for the wire feeder 88.

The welding location 22, 24 also includes a gas source 100, which provides gas 102 to the welding torch. The welding torch also receives wire 104 from the wire feeder, and power 106 from the power supply 78. The system may also include sensors 108 to take measurements at the welding torch 32.

Figure 3:
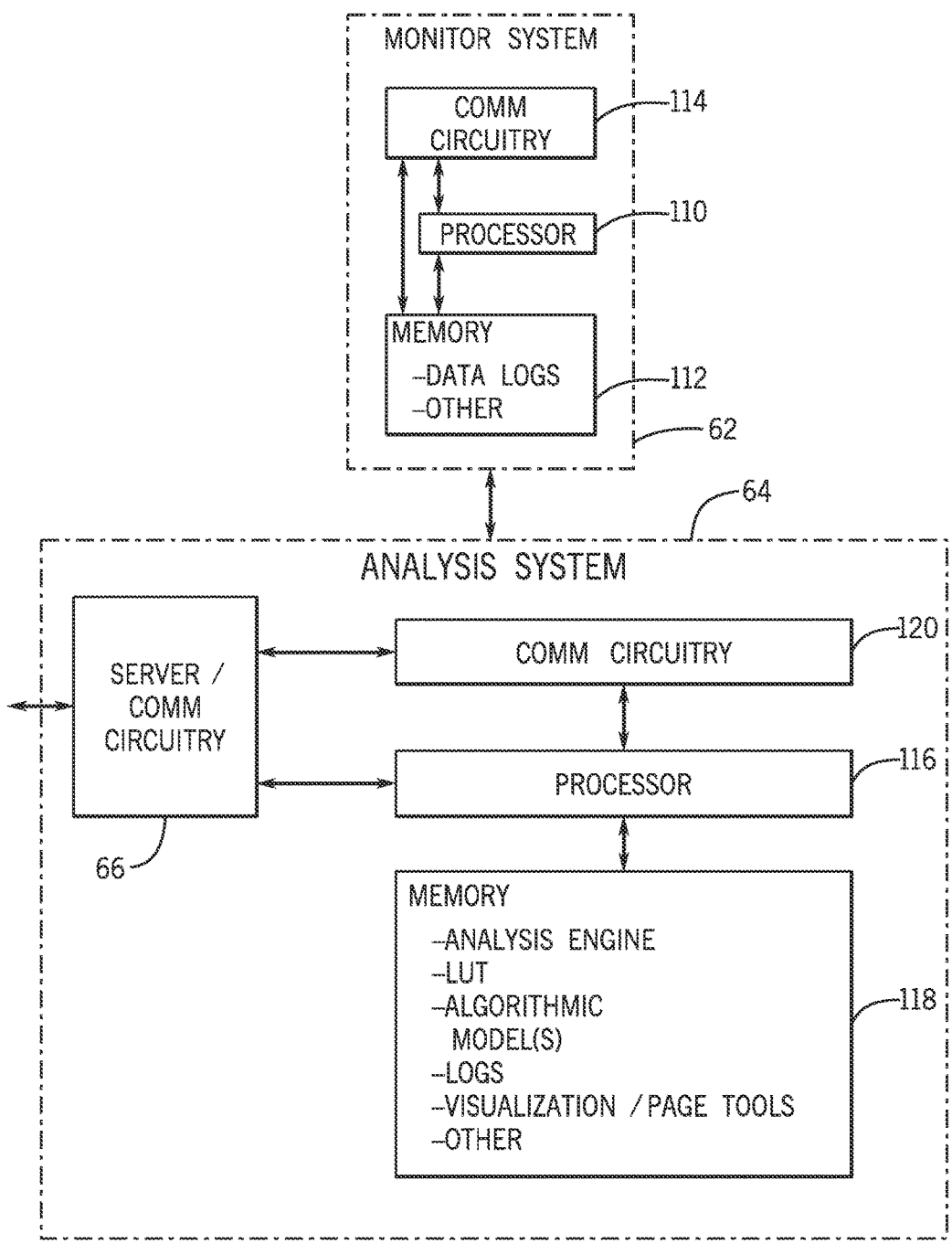
FIG. 3 is a schematic of one embodiment of the predictive monitoring and analysis system in accordance with aspects of the present disclosure.

FIG. 3 is a schematic of one embodiment of the predictive monitoring and analysis system 10 shown in FIG. 1. The monitoring and/or reporting system includes a processor 110, memory 112, and communication circuitry 114. The communication circuitry may send and receive data, which may go straight to the memory in the form of data logs, or be immediately processed by the processor, and then sent back to the communication circuitry, or to the memory. The analysis system 64 may include a server 66, communication circuitry 120, a processor 116, and memory 118. The communication circuitry 120 may receive data from the server 66, which is then sent to the processor 116, which will process the data using files stored in memory 118. Files stored in the memory 118 of the analysis system may include analysis engines, look up tables, algorithms or models, logs, visualization tools, or other files. Once data has been analyzed it may be stored in memory 118, or sent back to the monitoring system 62.

Figure 4:
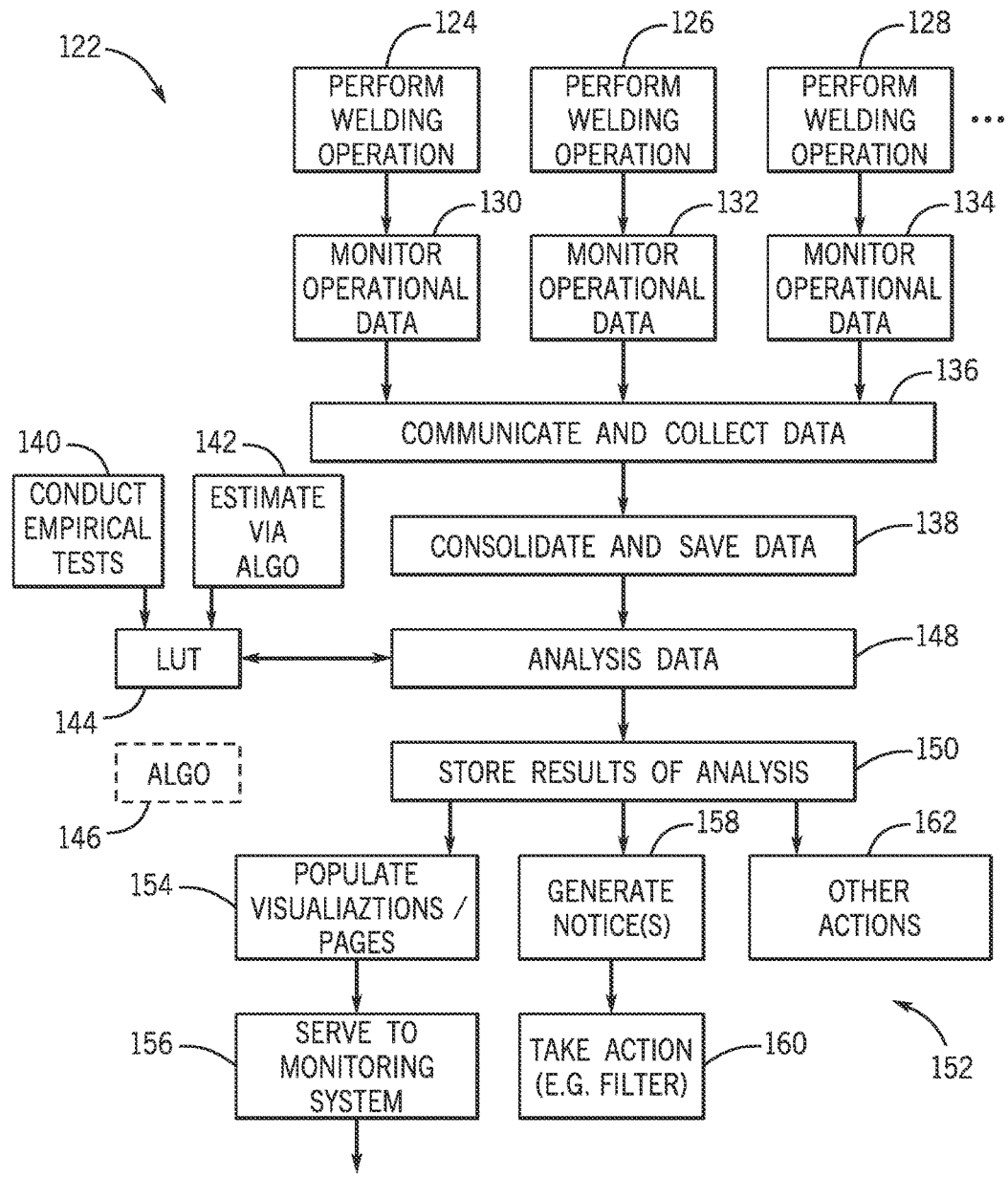
FIG. 4 is a flow diagram of the process performed by the systems shown in FIG. 1 in accordance with aspects of the present disclosure.

FIG. 4 is a flow diagram of the process 122 performed by the systems shown in FIGS. 1-3. In steps 124, 126, and 128 a welding operation is performed at one of the welding locations 22, 24. It should be understood that the work operation performed according to the present embodiment is a welding operation, however, steps 124, 126, and 128 could include a wide range of work operations that may produce fumes or airborne components including cutting, painting, grinding, sanding, polishing, wood work, etc. In steps 130, 132, and 134, the operational data of welding system 28 is monitored. Operational data could include arc on time, operator factor (the amount of time in an hour that an operator spends welding), electrode feed speed, electrode diameter, electrode type, electrode usage, gas usage, power usage, weld current, weld voltage, workpiece composition, fume evacuation stream flow rate, etc. It should be understood that the operational data monitored may vary for different work operations. For example, for a grinding work operation, the system may monitor the amount of time the grinder is running and in contact with the object being ground. Similarly, for a cutting work operation, the system may monitor the time that the blade is running and in contact with the material being cut. In step 136 the data is communicated to the monitoring and/or reporting system 62 via the communication circuitry 114. In step 138, the data is consolidated and saved to the memory component 112 of the monitor system 62. In step 138, the data may or may not be processed by the processor 110 in the monitor system 62.

In step 140, empirical testing is done wherein work operations are performed, operational data of the work operations is logged, and measurements are taken related to the presence and concentration of airborne components, fume composition, and perhaps other qualities that the user is interested in the system predicting.

In step 142, estimates for the presence and concentration of airborne components, fume composition, or other desired qualities are generated using an algorithm. This step may be performed in addition to step 140 or in place of step 140.

In step 144, a look up table is generated and populated using either the empirical testing data from step 140, or the estimates determined by the algorithm in step 142. The look up table is then stored in the memory component 118 of the analysis system 64. Alternatively, in step 146, an algorithm or model may be generated in addition to, or in place of the look up table generated in step 144.

In step 148, the analysis system analyzes the collected data. The data is received by the server 66 and passed to the communication circuitry 120, which then passes the data to the processor 116. The processor 116 then applies the data to the analysis engine, the look up table, and/or the algorithmic models, and estimates the presence and concentration of airborne components or the amount and content of fumes at a given moment in time. The processor may also generate visualizations or pages for the operator or a manager to view.

In step 150, the analysis system 64 stores processed data and the results of analysis in data logs on the memory component 118. This step allows for the data to be further analyzed at a later time.

Once the analysis is complete and the results have been stored, the system can go in any number of directions 152. In step 154, the system may populate visualizations or operator pages, which may provide an operator, a manager, or an analyst with an easy to understand representation regarding the presence and concentration of airborne components.

In step 156, the data or results of analysis may be sent back to the monitoring and/or reporting system 62 via the server 66. The data or results may then be stored in the memory component 112 of the monitoring system 62, or be sent back via the network 60 and communication system 40 of welding location 22 and displayed on the operator interface 30.

In step 158, the analysis system 64 may generate notices (e.g., a warning that the concentration of a specified airborne component is above a set threshold) to be sent to a manager or displayed on the operator interface 30 of welding location 22. Additionally, in step 160, the analysis system may send instructions to take a certain action, for example turning on the collection and exhaust system 12, or to adjust the fan speed of blower 48 or the blower/fan system 14. Sent instructions may also relate to the opening and closing of valves, or any other action related to the presence and concentration of airborne components around welding location 22. It should be understood that once the analysis has been performed, the system could be configured to do any number of things with the results of the analysis 162. As such, the listed examples are merely examples and not intended to limit the scope of the system.

Figure 5:
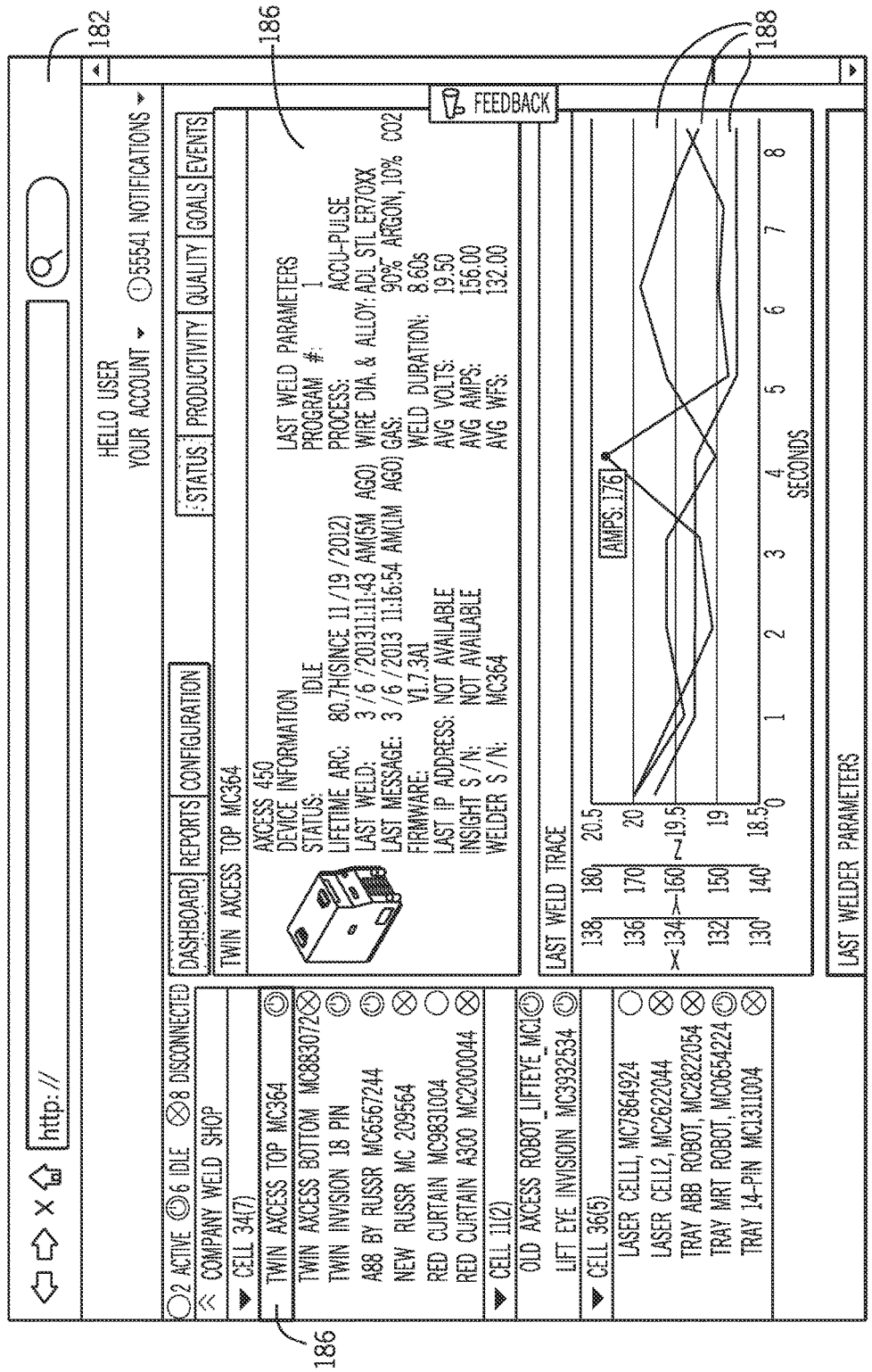
FIG. 5 is an exemplary user-viewable summary or report in the form of a web page summarizing certain fume-related data in accordance with aspects of the present disclosure.

FIG. 5 shows an Insight visualization 182, which is an example of a visualization produced in step 154 of FIG. 4. The Insight visualization 182 shown is created for an Insight system, but a similar visualization could be created for any welding interface system. The Insight visualization 182 may include a menu 184 section, a summary section 186, and/or traces 188. From the menu section 184, a user may select equipment from an expandable menu. A user may be a welder who only has access to the visualization for his or her equipment, or the user may be a manager who has access to visualizations for equipment in different welding locations 22, 24, different weld cells, or even different worksites 74, 76. The summary section 186 may include a table of information related to the selected equipment. The information shown may include equipment status, arc on time, operator factor, total run time, firmware version, serial numbers, welding parameters for current or previous welds, electrode information, and power information. The traces 188 include graphs of measured operational data or predicted information (X, Y, Z) over time. Such information may include fume generation rate, smoke content, manganese content, spatter, emissions at the welding location, amperage, voltage, electrode speed, arc on time, operator factor (the amount of time in an hour that an operator spends welding), etc. It should be understood that FIG. 5 is merely an example one possible visualization and that many configurations of visualizations may be available.

Figure 6:
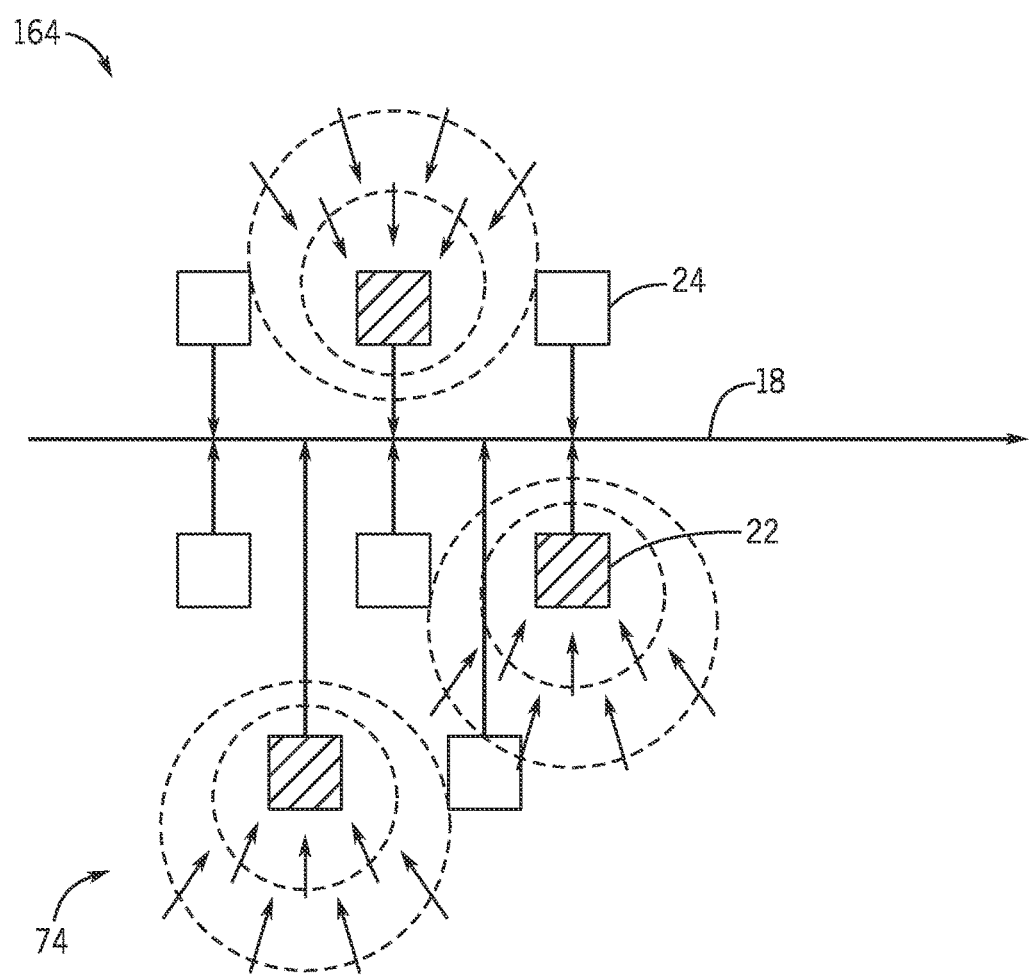
FIG. 6 is another exemplary user-viewable summary of fume-related data in accordance with aspects of the present disclosure.

FIG. 6 is another example of a visualization 164 produced in step 154 of FIG. 4. The present visualization 164 provides a visual representation of the presence and concentration of airborne components at a worksite 74 or in a welding environment at a given moment in time. At any given time, a worksite 74 may have a number of welding locations 22 in use, while the remaining welding locations 24 are not in use. The various weld locations 22, 24, may or may not be connected by a series of headers and conduits 18. The analysis system 64 receives weld data from a number of different welding locations 22, 24, and then, knowing the spacing of the welding locations 22, 24, can populate a visualization 164 to create a graphical representation of the concentration of airborne components throughout the worksite 74, weld cell, or workshop. It should be understood that this is just one example of a visualization and not intended to limit the various types of visualizations the system is capable of producing. Visualizations 164 may include graphs, color-coded maps, vector maps, or various other ways to communicate the presence and concentration of airborne components at different locations 20 throughout the worksite 74.

Figure 7:
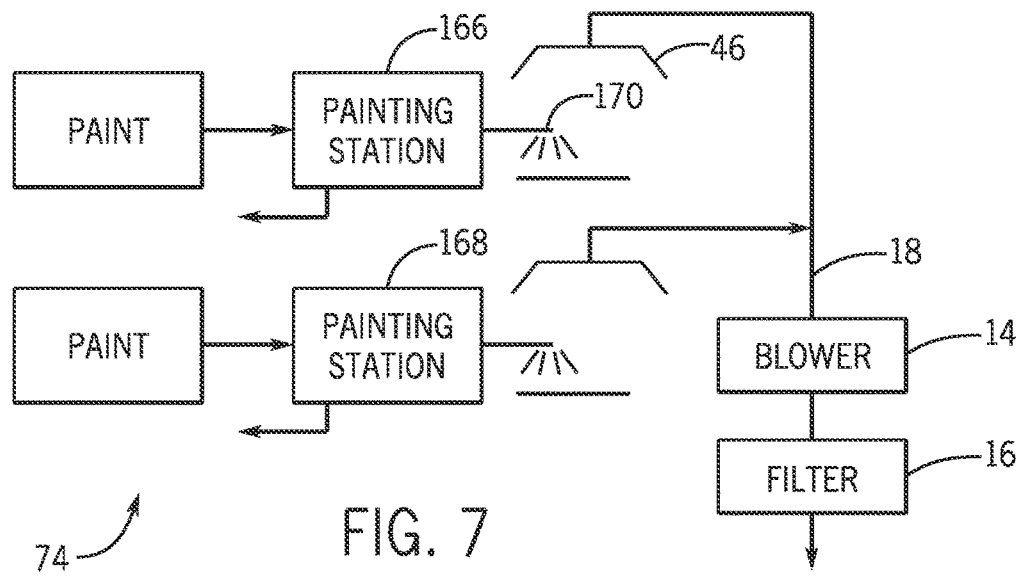
FIG. 7 is a diagrammatical representation of another type of fume-producing operation in the form of painting operations in which fume data may be collected and estimates made and communicated in accordance with aspects of the present disclosure.

FIG. 7 is a schematic similar to FIG. 1, but showing painting, rather than welding, as the work operation. In such an embodiment, a worksite 74 may have a plurality of paint stations 166, 168, which may or may not be connected to a network of headers and conduits 18 connected to a blower 14 and a filter 16. A paint spray nozzle 170 is configured to spray paint onto an object to be painted. Above the spray nozzle 170 may be hood 46, configured to draw air up from the painting location and into the collection and exhaust system. As with the welding system 28 in FIG. 1, the painting station 166 collects working data and transmits the data to a monitoring and analysis system, which predicts the presence and concentration of airborne components at the paint station or at the worksite at a given point in time.

Figure 8:
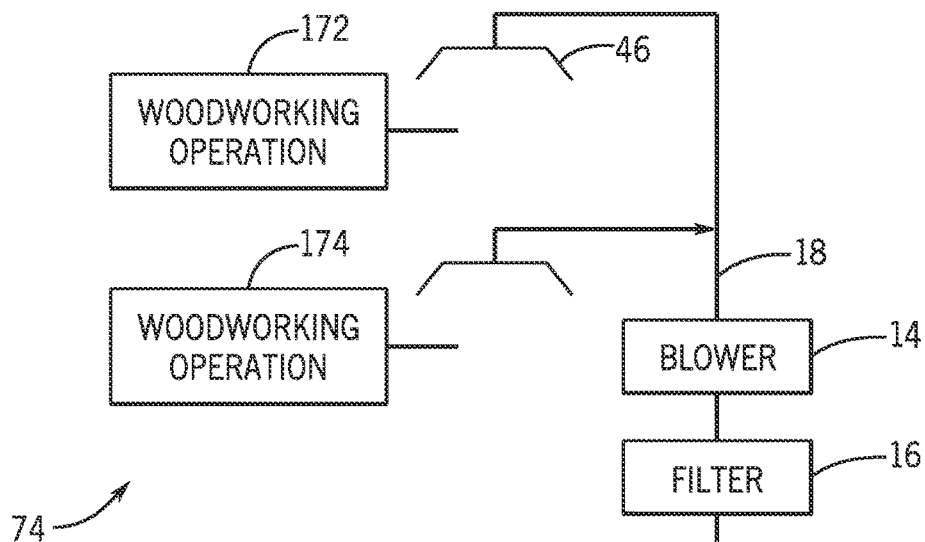
FIG. 8 is a diagrammatical representation of yet another operation in the form of a woodworking operation in which fume data may again be collected and estimates made and communicated in accordance with aspects of the present disclosure.

Similarly, FIG. 8 is a schematic showing woodworking as the work operation. In such an embodiment, a worksite 74 may have a plurality of woodworking stations 172, 174, which may or may not be connected to a network of headers and conduits 18 connected to a blower 14 and a filter 16. Above the woodworking stations 172, 174 may be hood 46, configured to draw air up from the woodworking location and into the collection and exhaust system. As with the welding system 28 in FIG. 1, and the painting stations 166, 168 of FIG. 7, the woodworking stations 172, 174 collect working data and transmit the data to a monitoring and analysis system, which would predict the presence and concentration of airborne components at the woodworking station or at the worksite at a given point in time.

Figure 9:
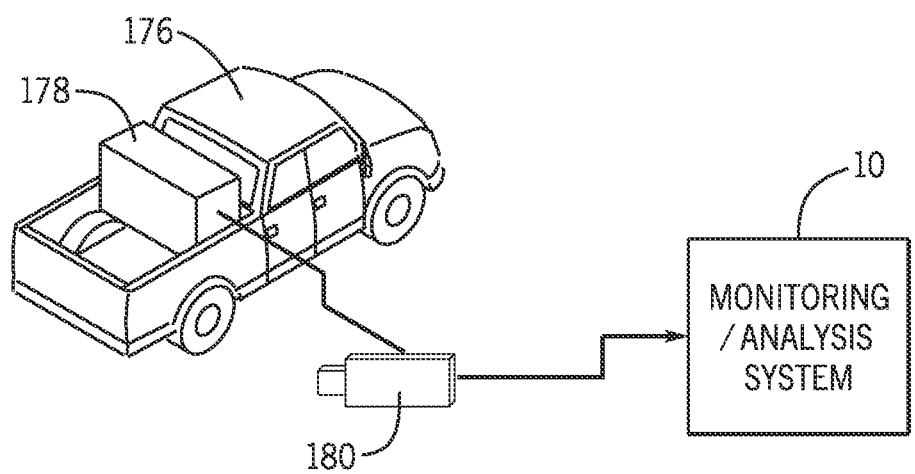
FIG. 9 shows a truck outfitted with equipment for performing a working operation.

The monitoring and analysis system 10 may also be used outside of the traditional factory or workshop setting and without a fume collection system. For example, FIG. 9 shows a truck 176 outfitted with equipment 178 for performing a working operation. The equipment 178 may be for any number of working operations including, but not limited to welding, painting, cutting, woodwork, grinding, or spraying. Such an embodiment would allow an operator to perform working operations outside of the traditional factory or workshop environment. In such an embodiment, equipment 178 may collect operational data and transmit the data to a predictive monitoring and analysis system 10, which would predict the fume composition or the presence and concentration of airborne components at a given moment, either in real time, on a delay, or after the operation has been completed. Equipment 178 may transfer the data via a cellular data connection, a wired or wireless internet connection, or some other method of communication. In the event that a communication connection cannot be established, for example in remote rural locations, equipment 178 may log operational data on a memory device, such as a USB drive 180, an SD card, or some other fixed or removable memory to be communicated to the predictive monitoring and analysis system 10 at a later time.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system comprising:
a fume collection system configured to collect fumes from a welding operation;
a plurality of data sources configured to detect operational data of the fume collection system and/or of the welding operation indicative of at least two of arc on time, operator factor, electrode feed speed, electrode size, and electrode type;
an analysis system, comprising at least one processor, configured to analyze the operational data and to estimate fume data indicative of amount and content of the fumes; and
a reporting system, comprising at least one processor, configured to populate at least one user viewable electronic report based upon the fume data.

2. The system of claim 1, wherein the data sources provide operational data indicative of at least two of welding current, welding voltage, welding wire composition, workpiece composition, and fume evacuation stream flow rate.

3. The system of claim 1, wherein the fume collection system comprises at least one fixed fume collection point.

4. The system of claim 1, wherein the fume collection system comprises at least one movable fume collection point.

5. The system of claim 1, wherein the analysis system estimates the fume data based upon reference to a multi-dimensional look up table referencing multiple operational data dimensions.

6. The system of claim 1, wherein the analysis system is configured to store the fume data.

7. The system of claim 1, wherein the reporting system comprises a server configured to transmit the user viewable electronic report in the form of a web page.

8. The system of claim 1, wherein the fume collection system is configured to collect fumes from multiple welding operations simultaneously, and there in the analysis system is configured to analyze operational data from each of the multiple welding operations and to estimate fume data indicative of amount and content of fumes from each of the multiple welding operations.

9. The system of claim 1, wherein the reporting system comprises a server configured to transmit the user viewable electronic report in the form of a web page summarizing the fume data for the multiple welding operations.

10. The system of claim 1, wherein the reporting system is configured to provide a user perceptible notice indicating an action advisable based upon the fume data.

11. A system comprising:
a fume collection system configured to collect fumes from a fume-generating operation;

a plurality of data sources configured to detect operational data of the fume collection system and/or of the fume-generating operation;

an analysis system, comprising at least one processor, configured to analyze the operational data and to estimate fume data indicative of amount and content of the fumes; and a reporting system, comprising at least one processor, configured to populate at least one user viewable electronic report based upon the fume data.

12. The system of claim 11, wherein the analysis system is configured to estimate the fume data based upon reference to a multi-dimensional look up table referencing multiple operational data dimensions.

13. The system of claim 11, wherein the analysis system is configured to store the fume data.

14. The system of claim 11, wherein the fume collection system is configured to collect fumes from multiple fume-generating operations simultaneously, and wherein the analysis system is configured to analyze operational data from each of the multiple fume-generating operations and to estimate fume data indicative of amount and content of fumes from each of the multiple fume-generating operations.

15. The system of claim 11, wherein the reporting system comprises a server configured to transmit the user viewable electronic report in the form of a web page summarizing the fume data for the multiple fume-generating operations.

16. The system of claim 11, wherein the reporting system is configured to provide a user perceptible notice indicating an action advisable based upon the fume data.

17. A method comprising:
extracting fumes from a welding operation via a fume extracting system;
collecting operational data of the fume extracting system and/or of the welding operation from a plurality of data sources;
automatically analyzing the operational data to estimate fume data indicative of amount and content of the fumes; and
generating a user viewable electronic report based upon the fume data.

18. The method of claim 17, wherein the operational data comprises data indicative of at least two of arc on time, operator factor, welding current, welding voltage, welding electrode feed speed, electrode size, welding electrode type, welding electrode composition, workpiece composition, and fume evacuation stream flow rate.

19. The method of claim 17, comprising determining the fume data based upon reference to a multi-dimensional look up table referencing multiple operational data dimensions.

20. The method of claim 17, comprising collecting fumes from multiple welding operations simultaneously, and analyzing operational data from each of the multiple fume-generating operations and to estimate fume data indicative of amount and content of fumes from each of the multiple fume-generating operations.

21. A system comprising:
a plurality of data sources configured to detect operational data of a fume-generating operation from an empirically determined look up table or a model, without a fume collection system;
an analysis system, comprising one or more processors, configured to analyze the operational data and to estimate fume data indicative of amount and content of the fumes without measuring the amount and content of the fumes; and a reporting system, comprising one or more processors, configured to populate at least one user viewable electronic report based upon the fume data.

22. The system of claim 21, wherein the analysis system estimates the fume data based upon reference to a multi-dimensional look up table referencing multiple operational data dimensions.

23. The system of claim 21, wherein the analysis system is configured to store the fume data.

24. The system of claim 21, wherein the plurality of data sources are configured to detect operational data from multiple fume-generating operations simultaneously, and wherein the analysis system is configured to analyze operational data from each of the multiple fume-generating operations and to estimate fume data indicative of amount and content of fumes from each of the multiple fume-generating operations.

25. The system of claim 21, wherein the reporting system comprises a server configured to transmit the user viewable electronic report in the form of a web page summarizing the fume data for the multiple fume-generating operations.

26. The system of claim 21, wherein the reporting system is configured to provide a user perceptible notice indicating an action advisable based upon the fume data.

27. The system of claim 1, comprising a control system configured to receive instructions from the analysis system based on the estimated fume date and to control the fume collection system based on the instructions.

28. The system of claim 1, comprising a control system configured to receive instructions from the analysis system based on the estimated fume date and to control the welding operation based on the instructions.

29. The method of claim 17, comprising controlling the fume extraction system based on the estimated fume data.

30. The method of claim 17, comprising controlling the welding operation system based on the estimated fume data.

31. A system comprising:
an analysis system, comprising one or more processors, configured to:
receive operational data of a welding operation from a plurality of data sources from an empirically determined look up table or a model, without a fume collection system; and
analyze the operational data to estimate fume data indicative of amount and content of the fumes generated by the welding operation without measuring the amount and content of the fumes; and
a reporting system, comprising one or more processors, configured to populate at least one user viewable electronic report based upon the fume data.

32. The system of claim 31, wherein the analysis system estimates the fume data based upon reference to a multi-dimensional look up table referencing multiple operational data dimensions.

33. The system of claim 31, wherein the system is configured to control a fume extraction system based on the estimated fume data.

34. The system of claim 31, wherein the system is configured to control a welding system performing the welding operation based on the estimated fume data.

35. The system of claim 31, wherein the reporting system is configured to provide a user perceptible notice indicating an action advisable based upon the fume data.

* * * * *